(12) United States Patent
Nakayoshi et al.

(10) Patent No.: US 7,453,540 B2
(45) Date of Patent: Nov. 18, 2008

(54) LIQUID CRYSTAL DISPLAY DEVICE WITH PARTICULAR ELECTRODES

(75) Inventors: Yoshiaki Nakayoshi, Tokyo (JP); Kazuhiko Yanagawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 298 days.

(21) Appl. No.: 11/489,620

(22) Filed: Jul. 20, 2006

(65) Prior Publication Data

US 2006/0256270 A1    Nov. 16, 2006

Related U.S. Application Data

(62) Division of application No. 10/926,183, filed on Aug. 26, 2004, now Pat. No. 7,084,948, which is a division of application No. 10/328,027, filed on Dec. 26, 2002, now Pat. No. 6,784,964.

(30) Foreign Application Priority Data

Dec. 27, 2001   (JP) .............................. 2001-396509

(51) Int. Cl.
   *G02F 1/1343* (2006.01)
(52) U.S. Cl. ................... 349/141; 349/139; 349/143
(58) Field of Classification Search ............. 349/141, 349/143, 147, 43, 144, 146
See application file for complete search history.

(56) References Cited

U.S. PATENT DOCUMENTS 5,852,485 A * 12/1998 Shimada et al. ............. 349/141
6,449,026 B1   9/2002 Min et al.
6,512,567 B2   1/2003 Ohta et al.
6,590,627 B2   7/2003 Tomioka et al.
6,600,541 B2   7/2003 Kurahashi et al.
6,611,310 B2 * 8/2003 Kurahashi et al. ........... 349/141
6,628,361 B2 * 9/2003 Takahashi et al. ........... 349/139
6,650,389 B1  11/2003 Sakamoto
6,914,645 B2 * 7/2005 Kurahashi et al. ............. 349/43
7,223,621 B2 * 5/2007 Kim ............................ 438/30

FOREIGN PATENT DOCUMENTS

| JP | H6-34996    | 2/1994 |
| JP | HEI6-34996  | 2/1994 |
| JP | H7-239480   | 9/1995 |
| JP | 2000-89240  | 3/2000 |
| JP | 2001-56474  | 2/2001 |
| JP | 2001-174818 | 6/2001 |

* cited by examiner

*Primary Examiner*—Mike Qi
(74) *Attorney, Agent, or Firm*—Antonelli, Terry, Stout & Kraus, LLP.

(57) ABSTRACT

A display device includes an insulated substrate, a thin film transistor formed over the insulated substrate, and first and second electrodes formed over the insulated substrate. A first insulating layer is formed over the insulated substrate, the first electrode, and the second electrode, and third and fourth electrodes are formed over the first insulating layer. A second insulating layer is formed over the first insulating layer, the third electrode, and the fourth electrode, and a fifth electrode formed over the second insulating layer, and a contact hole is formed in the first insulating layer and the second insulating layer. The fifth electrode is connected to the second electrode via the fourth electrode in the contact hole.

4 Claims, 11 Drawing Sheets

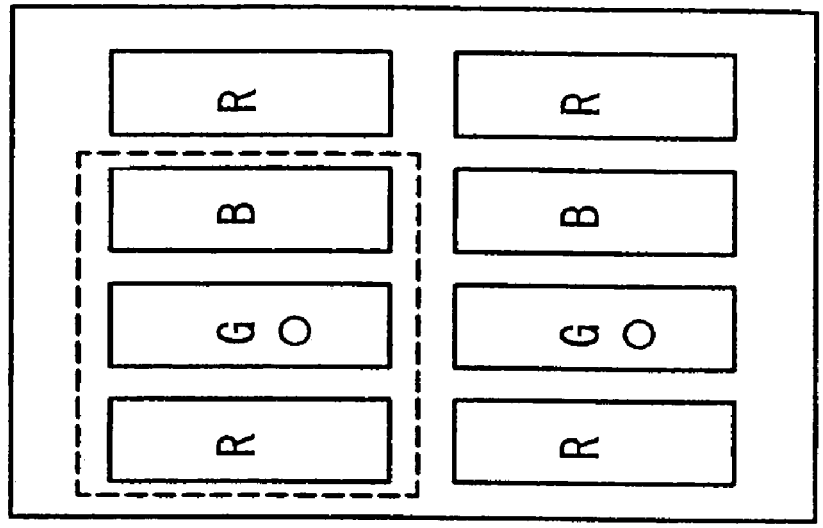
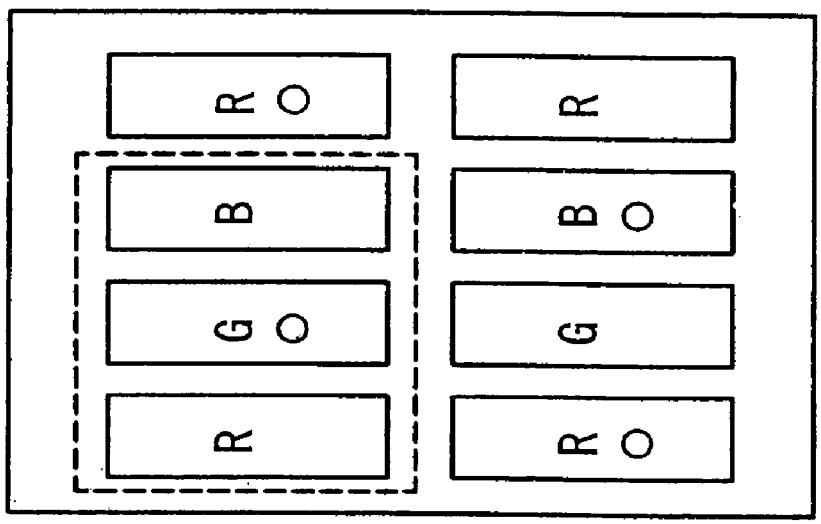
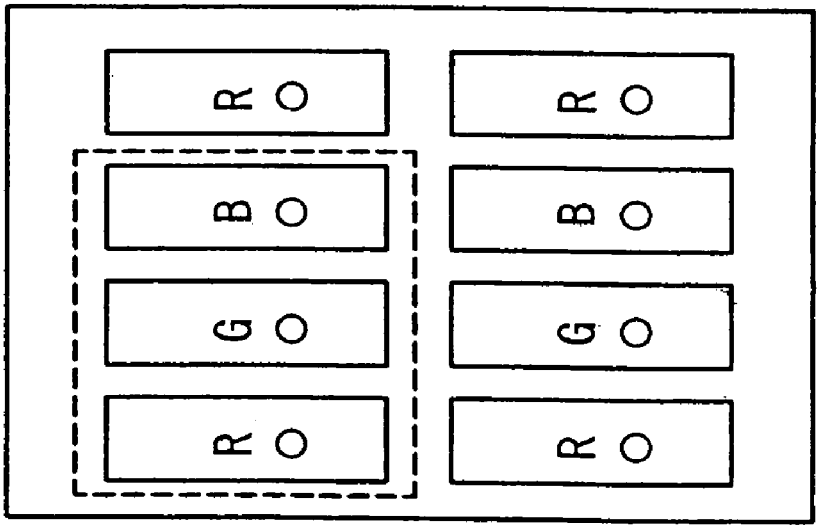

LIQUID CRYSTAL DISPLAY DEVICE WITH PARTICULAR ELECTRODES

CROSS REFERENCE TO RELATED APPLICATIONS

This is a division of U.S. application Ser. No. 10/926,183, filed Aug. 26, 2004, now U.S. Pat. No. 7,084,948, which is a division of U.S. application Ser. No. 10/328,027, filed Dec. 26, 2002, now U.S. Pat. No. 6,784,964, the subject matter of which is incorporated by reference herein.

BACKGROUND OF THE INVENTION

1. Field of the Invention

The present invention relates to a liquid crystal display device, and more particularly to a so-called in-plane electric field type of liquid crystal display (LCD) device or a so-called in plane switching (IPS) type of liquid crystal display device.

2. Description of the Related Art

A so-called in-plane electric field type of liquid crystal display device is constituted such that pixel electrodes and counter electrodes which generate an electric field therebetween are formed on pixel regions at a liquid-crystal-side surface of one of the respective substrates which are arranged to face each other by way of a liquid crystal and the liquid crystal is responsive to components of the electric field substantially parallel to the substrates.

In an active matrix type of liquid crystal display device adopting such a constitution, first of all, on the liquid-crystal-side surface of the above-mentioned one substrate, respective regions which are surrounded by a plurality of gate signal lines which are arranged in parallel and a plurality of drain signal lines which cross these respective gate signal lines and are arranged in parallel are formed as pixel regions.

Here, each pixel region is provided with a thin film transistor which is operated in response to a scanning signal from the gate signal line, the pixel electrode to which a video signal is supplied from the drain signal line through the thin film transistor, and the counter electrode to which a signal which becomes the reference with respect to the video signal is supplied.

Here, the pixel electrodes and the counter electrodes are respectively formed in a strip-shaped pattern which extend in one direction and these respective electrodes are formed of two pieces or more in number and are usually arranged alternately.

Further, with respect to such a constitution, there has been also known a constitution in which the counter electrodes are formed on upper surfaces of insulation films which are formed so as to cover the drain signal lines, and the drain signal lines and the center axes of the insulation films are substantially aligned, and the insulation films have a width larger than a width of the drain signal lines, and the insulation films are formed along the drain signal lines.

Such a constitution is provided for facilitating an electric line of force from the drain signal lines to terminate at the counter electrodes arranged above the drain signal lines and for preventing the electric line of force from terminating at the pixel electrodes. When the electric line of force terminates at the pixel electrodes, this gives rise to noises.

On the other hand, the liquid crystal display device having such a constitution requires counter voltage signal lines for supplying a signal to the counter electrodes and the counter voltage signal lines are arranged to run within the pixel regions so that there has been a drawback that the counter voltage signal lines impede the enhancement of a so-called numerical aperture of the pixel region.

Further, the counter electrodes and the counter voltage signal lines are arranged by way of an insulation layer in many cases and the electrical connection between the counter electrodes and the counter voltage signal lines is established via small through holes formed in the insulation layer and hence, the further enhancement of the reliability of connection has been requested. This coincides with the demand for high definition in recent years.

SUMMARY OF INVENTION

The present invention has been made in view of such circumstances and it is an object of the present invention to provide a liquid crystal display device which can enhance the numerical aperture of pixel regions.

Further, it is another object of the present invention to provide a liquid crystal display device which can ensure the reliable connection between counter electrodes and counter voltage signal lines.

According to a first embodiment of a liquid crystal display device of the present invention, there is provided for example, on a liquid-crystal-side surface of one substrate out of respective substrates which are arranged to face each other in an opposed manner by way of liquid crystal, regions which are surrounded by a plurality of gate signal lines which are arranged in parallel and a plurality of drain signal lines which cross the gate signal lines and are arranged in parallel are defined as pixel regions. A switching element is provided which is operated in response to a scanning signal from the gate signal line, a pixel electrode to which a video signal is supplied from the drain signal line through the switching element, and a counter electrode to which a signal which constitutes the reference with respect to the video signal is supplied through a counter signal voltage signal line are formed on each pixel region. The counter electrodes are formed as layers below a laminated body consisting of a plurality of insulation layers, and the counter voltage signal lines are formed of a non-light-transmitting (opaque) conductor, are formed as layers over the laminated body consisting of the plurality of insulation layers, and form a lattice-like pattern such that the counter voltage signal lines cover the gate signal lines and the drain signal lines, and have portions thereof electrically connected to the counter electrodes via through holes formed in the laminated body consisting of the plurality of insulation layers.

According to a modification of the first embodiment of the liquid crystal display device of the present invention, for example, the electric connection between the counter voltage signal line and the counter electrode is established through another conductive layer which is formed simultaneously with a conductive layer which constitutes the pixel electrode formed between the plurality of insulation layers.

According to another modification of the first embodiment of the liquid crystal display device of the present invention, for example, the electric connection between the counter voltage signal line and the counter electrode is established through another conductive layer which is formed simultaneously with a conductive layer which constitutes the drain signal line formed between the plurality of insulation layers.

According to a further modification of the first embodiment of the liquid crystal display device of the present invention, for example, which may include any of the aforementioned modifications, the electric connection between the counter voltage signal line and the counter electrode is established at two or more positions.

According to a second embodiment of the liquid crystal display device of the present invention, there is provided on a liquid-crystal-side surface of one substrate out of respective substrates which are arranged to face each other in an opposed manner by way of liquid crystal, regions which are surrounded by a plurality of gate signal lines which are arranged in parallel and a plurality of drain signal lines which cross the gate signal lines and are arranged in parallel are defined as pixel regions. A switching element which is operated in response to a scanning signal from the gate signal line, a pixel electrode to which a video signal is supplied from the drain signal line through the switching element, and a counter electrode to which a signal which constitutes the reference with respect to the video signal is supplied through a counter voltage signal line are formed on each pixel region. The counter electrodes are formed as layers below a laminated body consisting of a plurality of insulation layers, and the pixel electrodes are constituted of a plurality of groups of electrodes which are formed between two insulation layers out of the plurality of insulation layers of the laminated body and extend along the extending direction of the drain signal lines and are arranged in parallel in the direction which crosses the extending direction. The counter voltage signal lines are formed of a non-light-transmitting (opaque) conductor, are formed as layers over the laminated body consisting of the plurality of insulation layers, and form a lattice-like pattern such that the counter voltage signal lines cover the gate signal lines and the drain signal lines, and have portions thereof electrically connected to the counter electrodes via through holes formed in the laminated body consisting of the plurality of insulation layers.

According to a modification of the second embodiment of the liquid crystal display device of the present invention, for example, when the pixel region is viewed in plan view, a distance between the counter voltage signal which is formed such that the counter voltage signal covers the drain signal line and the pixel electrode which is arranged adjacent to the counter voltage signal line is set larger than a distance between the pixel electrodes which are arranged adjacent to each other.

According to another modification of the second embodiment of the liquid crystal display device of the present invention, for example, which may include the aforementioned modifications, when the pixel region is viewed in plan view, a distance between the counter voltage signal line which is formed such that the counter voltage signal line covers the drain signal line and the pixel electrode which is arranged adjacent to the counter voltage signal line is set larger than a distance between the counter voltage signal and the counter electrode which is arranged adjacent to the counter voltage signal line.

According to a third embodiment of the liquid crystal display device of the present invention, on a liquid-crystal-side surface of one substrate out of respective substrates which are arranged to face each other in an opposed manner by way of liquid crystal, regions which are surrounded by a plurality of gate signal lines which are arranged in parallel and a plurality of drain signal lines which cross the gate signal lines and are arranged in parallel are defined as pixel regions. A switching element which is operated in response to a scanning signal from the gate signal line, a pixel electrode to which a video signal is supplied from the drain signal line through the switching element, and a counter electrode to which a signal which constitutes the reference with respect to the video signal is supplied through a counter voltage signal line are formed on each pixel region. The counter voltage signal lines are made of Al or an Al alloy which has a surface thereof anodized and each counter voltage signal line is formed as a layer below a laminated body consisting of a plurality of insulation layers. The counter electrodes are formed of a light-transmitting conductor, are formed as layers over the laminated body consisting of the plurality of insulation layers, and form a lattice-like pattern such that the counter electrodes cover the gate signal lines and the drain signal lines, and have portions thereof electrically subjected to a capacitive coupling with the counter voltage signal lines via through holes formed in the laminated body consisting of the plurality of insulation layers.

According to a fourth embodiment of the liquid crystal display device of the present invention, on a liquid-crystal-side surface of one substrate out of respective substrates which are arranged to face each other in an opposed manner by way of liquid crystal, regions which are surrounded by a plurality of gate signal lines which are arranged in parallel and a plurality of drain signal lines which cross the gate signal lines and are arranged in parallel are defined as pixel regions, a switching element which is operated in response to a scanning signal from the gate signal line, a pixel electrode to which a video signal is supplied from the drain signal line through the switching element, and a counter electrode to which a signal which constitutes the reference with respect to the video signal is supplied through a counter voltage signal line are formed on each pixel region. The counter voltage signal lines are made of Al or an Al alloy which has a surface thereof anodized and each counter voltage signal line is formed as a layer below a laminated body consisting of a plurality of insulation layers, and each counter voltage signal line includes conductive material layers which are exposed from the counter voltage signal line at lower layers of at least portions of the counter voltage signal line. The counter electrodes are formed as layers over the laminated body consisting of the plurality of insulation layers, and form a lattice-like pattern such that the counter electrodes cover the gate signal lines and the drain signal lines, and have portions thereof electrically connected to the conductive material layers via through holes formed in the laminated body consisting of the plurality of insulation layers.

According to a modification of the fourth embodiment of the liquid crystal display device of the present invention, for example, the counter electrodes are formed of a light-transmitting conductive layer.

According to another modification of the fourth embodiment of the liquid crystal display device of the present invention, for example, which may include the aforementioned modifications thereof, the drain signal lines are formed between two insulation layers of the laminated body formed of the plurality of insulation layers, and material layers which are made of the same material as the drain signal lines are interposed between the counter electrodes and the conductive material layers.

Here, the present invention is not limited to the above-mentioned constitutions and various modifications can be made without departing from the technical concept of the present invention.

BRIEF DESCRIPTION OF THE DRAWINGS

FIGS. 15A-15C are explanatory views showing different arrangements of contact holes of the pixel of the liquid crystal display device according to the present invention.

DESCRIPTION OF THE PREFERRED EMBODIMENTS

Preferred embodiments of a liquid crystal display device according to the present invention are explained hereinafter in conjunction with attached drawings.

Embodiment 1

<<Overall Constitution>>

Figure 2A:
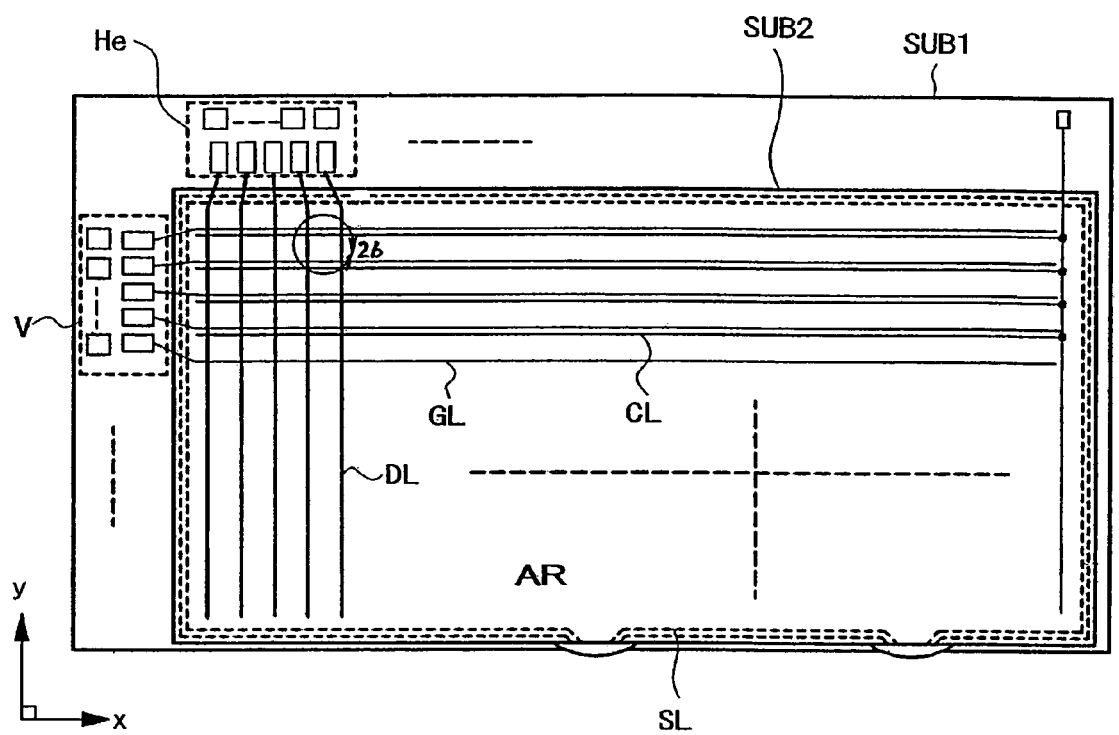
FIG. 2A is a view of the liquid crystal display device according to the present invention.

FIG. 2A is a view showing one embodiment of a liquid crystal display device according to the present invention. Although the drawing is an equivalent circuit diagram, the drawing is depicted in accordance with an actual geometrical arrangement.

In the drawing, there are provided a pair of transparent substrates SUB1, SUB2 which are arranged to face each other by way of liquid crystal and the liquid crystal is sealed by a sealing member SL which is also served for fixing the other transparent substrate SUB2 to one transparent substrate SUB1.

On a liquid-crystal-side surface of the above-mentioned one transparent substrate SUB1 which is surrounded by the sealing member SL, gate signal lines GL which extend in the x direction and are arranged in parallel in the y direction and drain signal lines DL which extend in the y direction and are arranged in parallel in the x direction are formed.

Regions which are surrounded by respective gate signal lines GL and respective drain signal lines DL constitute pixel regions and a mass of these respective pixel regions in a matrix array constitutes a liquid crystal display part AR.

Further, in respective pixel regions which are arranged in parallel in the x direction, a common counter voltage signal line CL which runs within respective pixel regions is formed. This counter voltage signal line CL is served as a signal line for supplying a voltage which constitutes the reference with respect to a video signal to counter electrodes CT of respective pixel regions which will be described later.

Figure 2B:
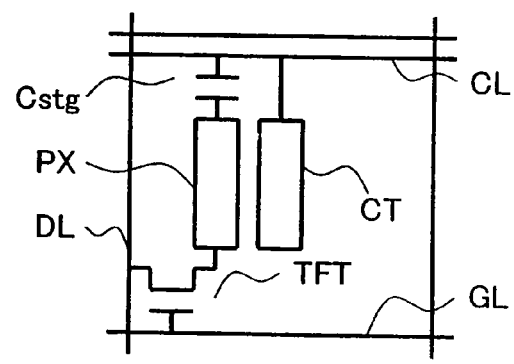
FIG. 2B is an enlarged view of a portion of 2b.

On each pixel region, a thin film transistor TFT which is operated in response to a scanning signal supplied from one-side gate signal line GL and a pixel electrode PX to which the video signal is supplied from one-side drain signal line DL by way of the thin film transistor TFT are formed as shown in enlarged view of FIG. 2B.

This pixel electrode PX generates an electric field between the pixel electrode PX and the counter electrode CT which is connected to the counter voltage signal line CL and the light transmittivity of the liquid crystal is controlled in response to this electric field.

Respective one ends of the above-mentioned gate signal lines GL extend over the sealing member SL and extending ends thereof constitute terminals to which output terminals of a vertical scanning driving circuit V are connected. Further, input terminals of the vertical scanning driving circuit V are configured to receive input of signals from a printed circuit board arranged outside the liquid crystal display panel.

The vertical scanning driving circuit V is constituted of a plurality of semiconductor devices, wherein a plurality of gate signal lines GL which are arranged close to each other are formed into a groups and one semiconductor device is allocated to each group.

In the same manner, respective one ends of the drain signal lines DL extend over the sealing member SL and extending ends constitute terminals to which output terminals of the video signal driving circuit He are connected. Further, input terminals of the video signal driving circuit He receive input of signals from a printed circuit board which are arranged outside the liquid crystal display panel.

The video signal driving circuit He is also constituted of a plurality of semiconductor devices, wherein a plurality of drain signal lines DL which are arranged close to each other are formed into a groups and one semiconductor device is allocated to each group.

Further, respective counter voltage signal lines CL have end portions thereof arranged at the right side in the drawing connected in common, and the connection line extends over the sealing member SL and the extending ends constitutes a terminal CLT. A voltage which becomes the reference with respect to the video signal is supplied from this terminal CLT.

With respect to respective gate signal lines GL, in response to the scanning signal from the vertical scanning circuit V, one of the gate signal lines GL is sequentially selected.

Further, to respective drain signal lines DL, using the video signal driving circuit He, the video signals are supplied in accordance with the timing of selecting the gate signal line GL.

Here, in the above-mentioned embodiment, although the vertical scanning driving circuit V and the video signal driving circuit He are constituted of the semiconductor devices mounted on the transparent substrate SUB1, these circuits may be constituted of so-called tape carrier type semiconductor devices which establish connections while striding over a span between the transparent substrate SUB1 and the printed circuit board, for example. Further, when a semiconductor layer of the thin film transistor TFT is constituted of polycrystalline silicon (p-Si), these circuits may be constituted such that the semiconductor dies which are formed of the polycrystalline silicon are formed on a transparent substrate SUB1 surface along with wiring layers.

<<Constitution of Pixels>>

Figure 1A:
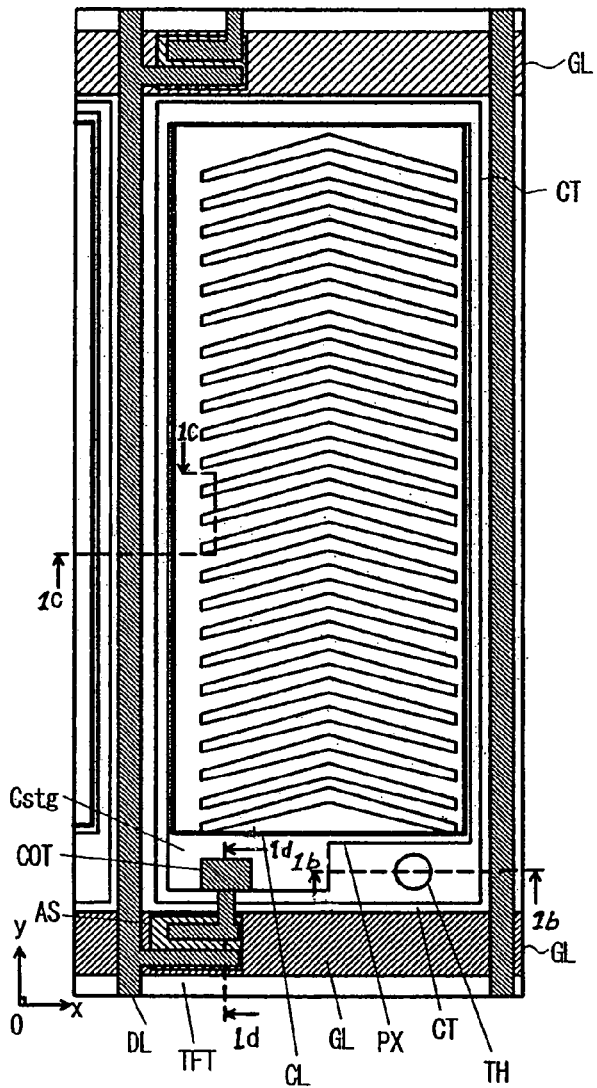
FIG. 1A is a plan view of a liquid crystal display device according to the present invention and FIGS. 1B, 1C and 1D are sectional views of FIG. 1A taken along lines 1b, 1c and 1d, separately.
Figure 1B:
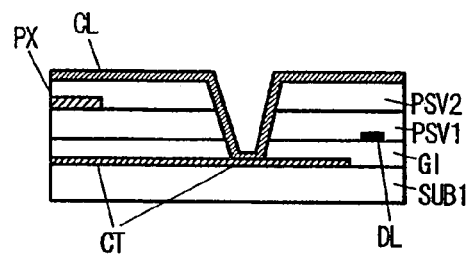
Figure 1C:
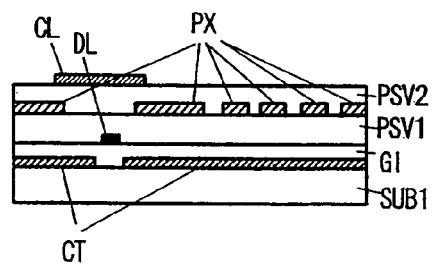
Figure 1D:
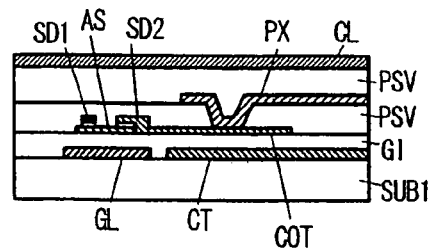

FIG. 1A is a plan view showing the constitution of one embodiment of the pixel regions. Further, FIG. 1B is a cross-sectional view taken along a line 1b-1b in FIG. 1A, FIG. 1C is a cross-sectional view taken along a line 1c-1c in FIG. 1A, and FIG. 1D is a cross-sectional view taken along a line 1d-1d of FIG. 1A.

In respective drawings, on the liquid-crystal-side surface of the transparent substrate SUB1, first of all, a pair of gate signal lines GL which extend in the x direction and are arranged in parallel in the y direction are formed.

These gate signal lines GL surround a rectangular region along with a pair of drain signal lines DL which will be described later and the region is constituted as the pixel region.

Then, on the surface of the transparent substrate SUB1 within the pixel region, the counter electrode CT which is formed of a light-transmitting conductive material is formed on a center portion excluding a small region defined in the periphery of the pixel region. As the light-transmitting conductor, for example, ITO (Indium Tin Oxide), ITZO (Indium Tin Zinc Oxide), IZO (Indium Zinc Oxide), $SNO_2$, $IN_2O_3$ or the like is used.

On the surface of the transparent substrate SUB1 on which the gate signal lines GL and the counter electrodes CT are formed, an insulation film GI made of SiN, for example, is formed such that the insulation film GI covers the gate signal line GL and the like.

The insulation film GI performs a function of an interlayer insulation film with respect to the gate signal lines GL in regions where the drain signal lines DL which will be described later are formed and performs a function of a gate insulation film in regions where the thin film transistors TFT which will be described later are formed.

Here, on a surface of the insulation film GI, semiconductor layers AS made of amorphous Si, for example, are formed such that the semiconductor layers AS are overlapped to portions of the gate signal lines DL.

The semiconductor layer AS forms a portion of the thin film transistor TFT and it is possible to constitute an MIS type of transistor having an inverse staggering structure which uses a portion of the gate signal line as a gate electrode by forming a drain electrode SD1 and a source electrode SD2 on an upper surface thereof.

Here, the drain electrodes SD1 and the source electrodes SD2 are simultaneously formed along with the formation of the drain signal lines DL.

That is, the drain signal lines DL which extend in the y direction and are arranged in parallel in the x direction are formed, portions of the drain signal lines DL are extended onto the upper surfaces of the semiconductor layers AS so as to form the drain electrodes SD1, and the source electrodes SD2 are formed in such a manner that they are spaced apart from the drain electrodes SD1 by a length of a channel of the thin film transistor TFT.

Further, the source electrode SD2 is slightly extended toward the pixel region side so as to form a contact portion COT for establishing the electrical connection with the pixel electrodes PX which will be described later.

Then, on the surface of the transparent substrate SUB1, a protective film PSV1 is formed such that the protective film PSV1 covers the drain signal lines DL, the drain electrodes SD1 and the source electrodes SD2. The protective film PSV1 is made of an inorganic material layer such as an SiN film or the like, for example, and is provided for obviating the direct contact of the thin film transistors TFT with the liquid crystal along with a protective film PSV2 described later. That is, the protective film PSV1 is provided for preventing the characteristics of the thin film transistors TFT from being changed due to the direct contact with the liquid crystal.

On a surface of the protective film PSV1, the pixel electrodes PX which are made of a light-transmitting conductor, for example, are formed. As the light-transmitting conductor, ITO (Indium Tin Oxide), ITZO (Indium Tin Zinc Oxide), IZO (Indium Zinc Oxide), $SnO_2$, $In_2O_3$ and the like are used.

Here, although the pixel electrode PX is formed of a large number of strip-like electrodes which substantially extend in the x direction and are arranged in the y direction, each electrode is formed in a mountain-shaped pattern having a bent portion substantially at a center portion of the extending direction of the electrode.

Although these pixel electrodes PX are configured to generate an electric field between peripheral end portions (edges) thereof and the counter electrodes CT, with the use of the above-mentioned pattern, the liquid crystal display device adopts a so-called multi-domain method.

That is, even when the molecular arrangement of the liquid crystal is in the same state, the polarization state of the transmitting light is changed depending on the incident direction of the light incident on the liquid crystal display panel and hence, the light transmissivity is changed in response to the incident direction.

Such viewing angle dependency of the liquid crystal display panel has the display characteristics that when a viewing point is slanted obliquely with respect to the viewing angle direction, an inverting phenomenon of luminance is induced so that images are stained in color display.

Accordingly, the pixel electrodes PX are patterned such that each pixel electrode PX has at least one bent portion in the extension direction thereof and the counter electrodes CT are formed in a shape which shifts such a pattern in parallel, and using an imaginary line which is formed by binding the bent points of respective electrodes as a boundary, the directions of the electric fields acting between the pixel electrodes PX and the counter electrodes CT are made different from each other between one region and the other region, whereby the stain of images generated depending on the viewing angle is compensated.

Although the counter electrode CT is formed on the substantially whole area of the pixel region in this embodiment, a portion which actually performs the function of the counter electrode CT is a portion where the pixel electrode PX is shifted in parallel as described above. It is possible to connect the counter electrode of one pixel region to a counter electrode of the next pixel region.

Then, since a group of electrodes which constitute the pixel electrode PX are electrically connected to each other, they are integrally formed in a periphery thereof using the same material. Accordingly, the pixel electrode PX is, as a whole, configured as a pattern in which a large number of slits (mountain-like slits) which extend in the x direction and are arranged in parallel in the y direction are formed in the conductive layer at the center portion of the pixel region except for a minute region in the periphery of the pixel region.

A portion of the pixel electrode PX having such a pattern is electrically connected to the contact portion COT of the source electrode SD2 of the thin film transistor TFT via a through hole which is preliminarily formed in the protective film PSV1.

Further, on the surface of the transparent substrate SUB1, the protective film PSV2 is formed such that the protective film PSV2 covers the pixel electrodes PX. The protective film PSV2 is made of organic material such as resin, for example.

As has been described above, the protective film PSV2 has a function of a protective film PSV for obviating the direct contact of the thin film transistors TFT with the liquid crystal along with the protective film PSV1. Here, by using organic material as a material of the protective film PSV2, the surface of the protective film PSV2 can be leveled so that the rubbing characteristics of an orientation film formed over an upper surface of the protective film PSV2 can be enhanced.

Further, on the surface of the protective film PSV2, the counter voltage signal lines CL served for supplying signals to the counter electrodes CT are formed.

As a material of the counter voltage signal lines CL, a material having small electric resistance is selected. Accordingly, metal or the like is preferably used.

Further, the counter voltage signal lines CL define a lattice-like (matrix) pattern which covers the drain signal lines DL and the gate signal lines GL, wherein opening portions are formed in the center portion of the pixel regions excluding the minute portions around the pixel regions. That is, the counter voltage signal lines CL are formed such that the pixel regions are substantially exposed. The matrix pattern of the counter voltage signal lines reduces the resistance of the counter voltage signal lines and shields the electric field of gate signal lines and drain signal lines. The counter voltage signal lines cover all of the drain signal lines and a part of gate signal line.

The counter voltage signal lines CL which are formed in such a pattern can supply the counter voltage signals from any portion or from a plurality of portions in the periphery of each liquid crystal display part AR. Accordingly, it is possible to eliminate the waveform distortion of the counter voltage signals in the counter voltage signal lines CL whereby the occurrence of smear and luminance inclination can be reduced.

Further, since the electric resistance and the feeding resistance of the counter voltage signal lines CL can be reduced as a whole, it is possible to reduce the transverse smear to equal to or less than ⅓ in a so-called common inverting driving.

Further, the counter voltage signal lines CL which cover the drain signal lines DL along the longitudinal direction of the drain signal lines DL have center axes thereof substantially aligned with the center axes of the drain signal lines DL and have a width larger than that of the drain signal lines DL. Due to such a constitution, an electric field which becomes a cause of noises from the drain signal lines DL can be terminated at the counter voltage signal line CL side, while the termination of the electric field at the pixel electrodes PX is made difficult.

In this case, the parasitic capacitance between the drain signal lines DL and the counter voltage signal lines CL can be largely reduced due to the protective film PSV2 made of organic material which is interposed between the drain signal lines DL and the counter voltage signal lines CL. This is because that the protective film PSV2 exhibits the small dielectric constant.

In the same manner, the counter voltage signal lines CL which cover the drain signal lines DL along the longitudinal direction of the drain signal lines DL have center axes thereof substantially aligned with the center axes of the drain signal lines DL and have a width larger than that of the drain signal lines DL.

In this case, the counter voltage signal lines CL are formed such that the counter voltage signal lines CL also cover the thin film transistors TFT. The counter voltage signal lines CL are made of non-light-transmitting metal. This is because that the counter voltage signal lines CL can shield an external light irradiated to the thin film transistors TFT so as to prevent the degradation of the characteristics of the thin film transistor TFT.

Here, the counter voltage signal line CL is configured to have a region which is overlapped to a portion of the pixel electrode PX within the pixel region. On this overlapped region, a capacitive element Cstg which uses the protective film PSV2 as a dielectric film is formed.

The capacitive element Cstg is configured to have a function of storing the video signals supplied to the pixel electrode PX, for example, for a relatively long period.

Then, on the upper surface of the transparent substrate SUB1 on which the counter electrodes CT are formed in this manner, an orientation film (not shown) is formed such that the orientation film covers the counter electrodes CT. The orientation film is a film which is brought into direct contact with the liquid crystal and determines the initial orientation direction of the liquid crystal molecules by rubbing formed on the surface thereof.

Here, on a liquid-crystal-side surface of the transparent substrate SUB2 which is arranged to face the transparent substrate SUB1 by way of the liquid crystal, color filters are formed. The color filters are, for example, constituted of filters of respective colors such as red (R), green (G), blue (B) and formed in an arrangement where, for example, the red color filters are commonly formed in a group of respective pixel regions which are arranged in parallel in the y direction, and in respective neighboring groups of pixel regions which are arranged in the x direction adjacent to the previous group of pixel regions, the groups of pixel regions are arranged in the order of the group of red (R), the group of green (G), the group of blue (B), the group of red (R), . . .

A leveling film is formed on the surface of the transparent substrate on which the color filters are formed such that the leveling film covers the color filters. The leveling film is constituted of a resin film formed by coating and is provided for eliminating stepped portions which become apparent in the course of the formation of the color filters.

An orientation film is formed on a surface of the leveling film. The orientation film is a film which is brought into direct contact with the liquid crystal and determines the initial orientation direction of the liquid crystal molecules by rubbing formed on a surface thereof.

In this embodiment, a black matrix is not formed on the liquid-crystal-side surface of the transparent substrate SUB2. This is because that the counter voltage signal lines CL which are formed on the liquid-crystal-side surface of the transparent substrate SUB1 perform a function similar to a function of the black matrix. Accordingly, it is possible to enhance the accuracy of the alignment of the transparent substrate SUB2 with respect to the transparent substrate SUB1.

Embodiment 2

Figure 3:
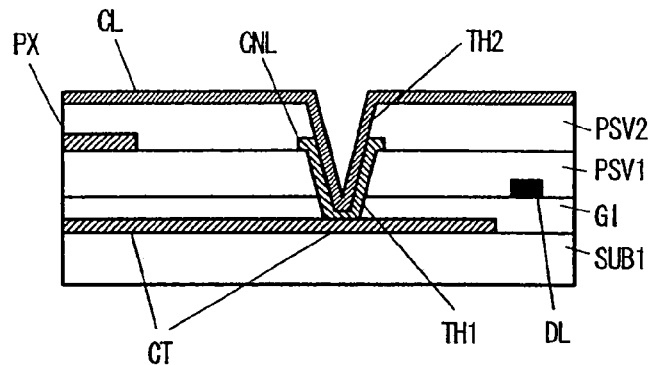
FIG. 3 is a cross-sectional view of the pixel of the liquid crystal display device according to the present invention.

FIG. 3 is a cross-sectional view of the pixel of another liquid crystal display device of the present invention and is a view corresponding to FIG. 1B.

The difference of FIG. 3 from that shown in FIG. 1B lies in that in the connection between the counter electrode CT and the counter voltage signal line CL via a through hole TH, a conductive layer CNL which is made of the same material as a material layer which constitutes a pixel electrode PX is interposed between the counter electrode CT and the counter voltage signal line CL. The material comprises a portion which is same level of the pixel electrode. The level means a distance from the substrate.

That is, at the time of forming the pixel electrodes PX on the upper surface of the protective film PSV1, the conductive layer CNL which is connected to the counter electrode CT via the through hole TH1 formed in the protective film PSV1 is simultaneously formed and, thereafter, the counter voltage signal lines CL which are formed on the upper surface of the protective film PSV2 are connected to the conductive layer CNL via the through hole TH2 formed in the protective film PSV2.

Due to such a constitution, it is possible to increase the contact area of the connecting portion between the counter electrode CT and the counter voltage signal line CL so that the reliable connection can be achieved.

Embodiment 3

Figure 4:
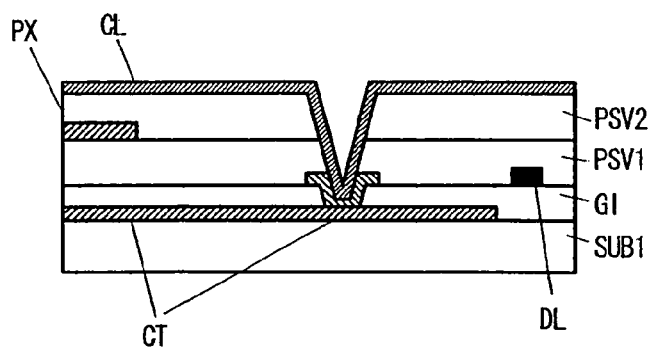
FIG. 4 is a cross-sectional view of the pixel of another liquid crystal display device according to the present invention.

FIG. 4 is a cross-sectional view of the pixel of another liquid crystal display device of the present invention and is a view corresponding to FIG. 3.

The difference of FIG. 4 from that of FIG. 3 lies in that in the connection between the counter electrode CT and the counter voltage signal line CL via a through hole TH, a conductive layer CNL which is made of the same material as a material layer of the drain signal line DL is interposed between the counter electrode CT and the counter voltage signal line CL.

When a conductor having a light transmissivity is used as the material of the counter electrode CT and, for example, Al or an Al alloy is used as the material of the counter voltage signal line CL, there is a possibility that the connection resistance assumes a large value. Accordingly, in this embodiment, for example, Cr, Mo, W or other high melting point metal or an alloy containing them are used as the material of the drain signal line DL. Due to such a constitution, it is possible to reduce the connection resistance between the counter electrode CT and the counter voltage signal line CL.

Embodiment 4

Figure 5:
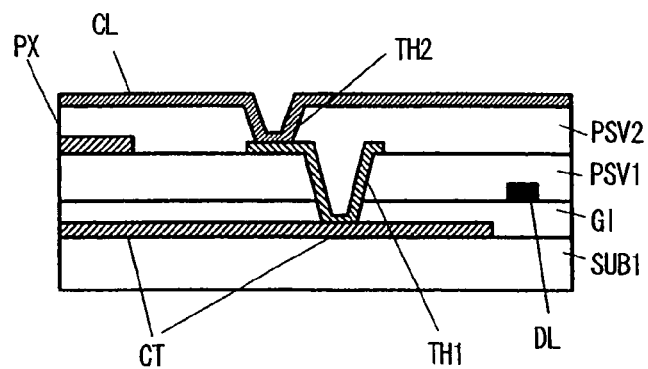
FIG. 5 is a cross-sectional view of the pixel of another liquid crystal display device according to the present invention.

FIG. 5 is a cross-sectional view of the pixel of another liquid crystal display device of the present invention and is a view corresponding to FIG. 3.

The difference of FIG. 5 from FIG. 3 lies in that the center axis of the through hole TH1 which is formed in the protective film PSV1 and the insulation film GI and the center axis of the through hole TH2 which is formed in the insulation film PSV2 are not aligned and these holes TH1, TH2 are formed at positions separate from each other.

Due to such a constitution, it is possible to level the surface of the protective film PSV2 made of organic material even at positions where the protective film PSV1 and the through hole TH1 of the insulation film GI are formed.

This implies that the recessed portion formed in the protective film PVS2 is formed of only the through hole TH2. Since a depth of the through hole TH2 is relatively small, it is possible to enhance the rubbing characteristics of the orientation film formed on the surface of the protective film PSV2.

Embodiment 5

Figure 6:
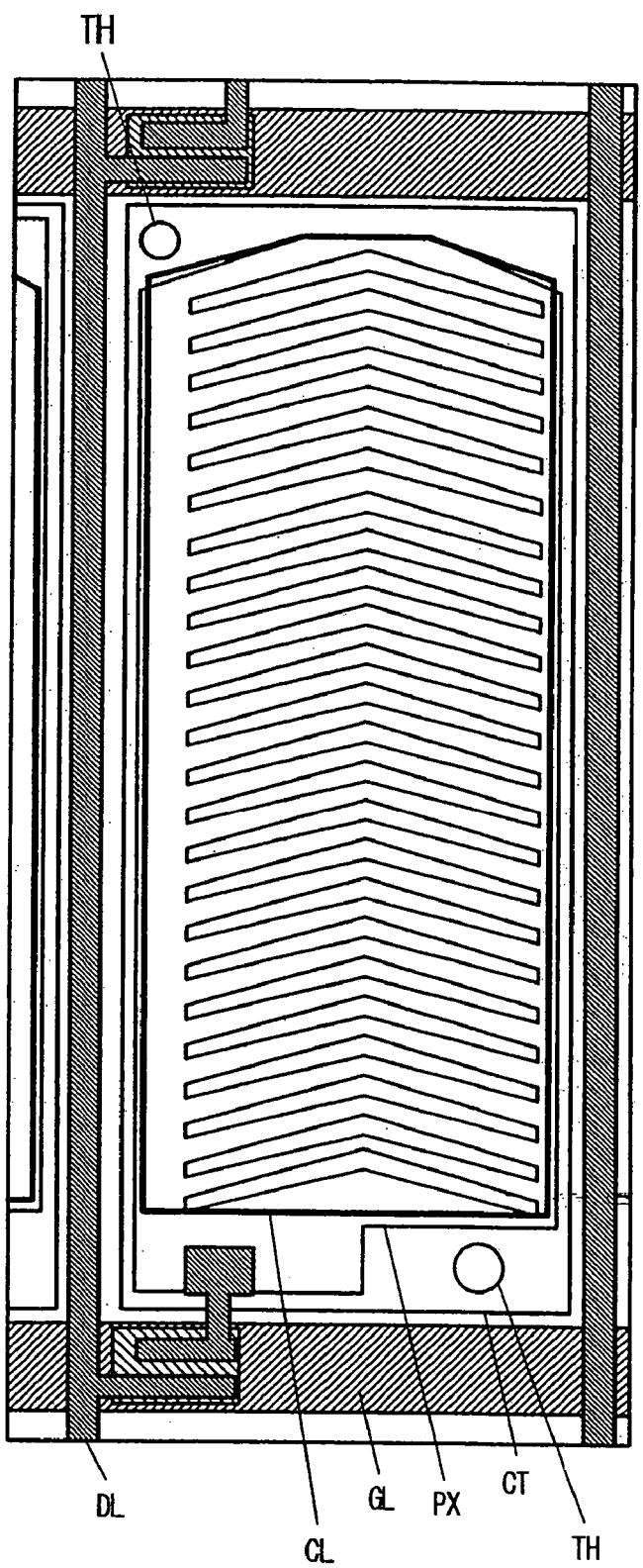
FIG. 6 is a plan view of the pixel of another liquid crystal display device according to the present invention.

FIG. 6 is a plan view of the pixel of another liquid crystal display device of the present invention and is a view corresponding to FIG. 1A.

The difference of FIG. 6 from FIG. 1A lies in that portions where the connection between the counter electrode CT and the counter voltage signal line CL is established are provided at two positions instead of one position.

As can be clearly understood from the above-mentioned constitutions, the connection between the counter electrode CT and the counter voltage signal line CL must be established via the through holes TH formed in a relatively multi-layered body consisting of the protective films PSV2, PSV1 and the insulation film GI and hence, the redundancy constitution which can obviate the occurrence of connection failure is established.

Further, in this embodiment, one through hole TH is formed in the vicinity of one gate signal line GL which surrounds the pixel region and the other through hole TH is formed in the vicinity of the other gate signal line GL which surrounds the pixel region.

Embodiment 6

Figure 7A:
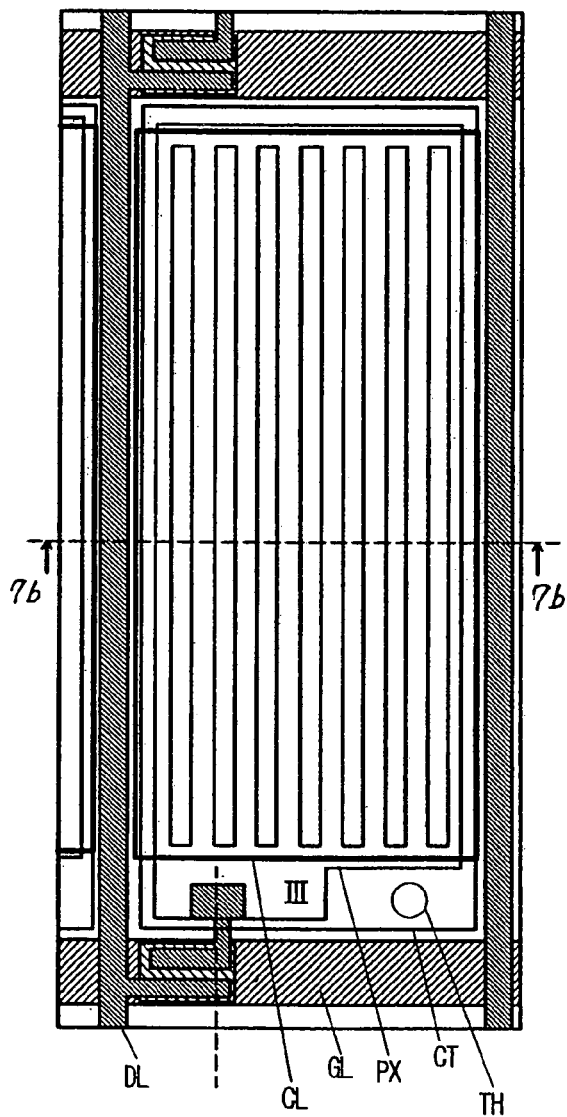
FIG. 7A is a plan view of the pixel of another liquid crystal display device according to the present invention and FIG. 7B is a sectional view taken along line 7b.
Figure 7B:
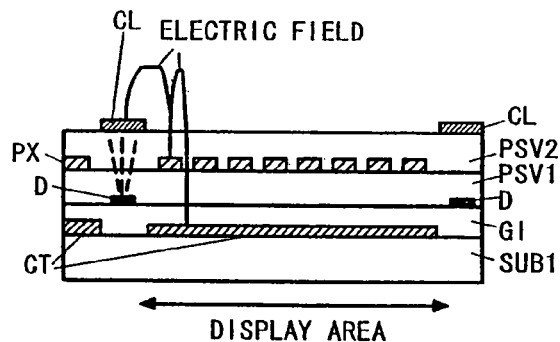

FIG. 7A is a plan view showing the pixel of another liquid crystal display device of the present invention and is a view corresponding to FIG. 1A. On the other hand, FIG. 7B is a cross-sectional view taken along a line 7b-7b in FIG. 7A.

The difference FIG. 7A from FIG. 1A lies in the constitution of the pixel electrodes PX. That is, in this embodiment, the pixel electrodes PX is constituted of a group of electrodes which extend in the y direction substantially linearly and are arranged in the x direction in parallel.

Also in this embodiment, each pixel electrode PX formed of a group of electrodes has upper and lower ends of the electrodes connected to each other.

Further, the protective film PSV2 is formed such that protective film PSV2 covers these pixel electrodes PX, while the counter voltage signal lines CL are formed over the upper surface of the protective film PSV2 such that the counter voltage signal lines CL cover the drain signal lines DL and the gate signal lines GL.

Due to such a constitution, among the respective electrodes of pixel electrode PX which are formed in the inside of the region of the opening portion of the counter voltage signal line CL, the electrode of the pixel electrode PX which is arranged adjacent to the drain signal line DL can be arranged closer to the counter voltage signal line CL. Accordingly, it is possible to give the function of the counter electrode CT to the counter voltage signal line CL such that an electric field is generated between the drain signal line DL and the counter voltage signal line CL.

with such constitution, it is possible to form the pixel region without forming an unnecessary region in the region of the opening portion of the counter voltage signal line CL whereby the numerical aperture can be enhanced.

That is, the electric field from the drain signal line DL is terminated at the counter voltage signal line CL side which is formed over the drain signal line DL in a substantially concentrated manner and hence, an amount of the electric field which spreads radially at both sides of the counter voltage signal line CL is reduced. Accordingly, it is possible to constitute the pixel region which can contribute to the display even in the vicinity of the counter voltage signal line CL.

Figure 8:
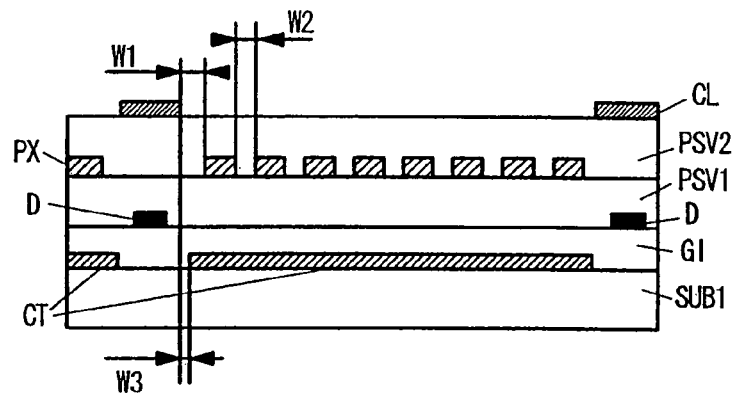
FIG. 8 is a cross-sectional view of the pixel of another liquid crystal display device according to the present invention.

Further, by adopting the above-mentioned constitution, as shown in FIG. 8 which corresponds to FIG. 7B, it is possible to set a distance W1 between the counter voltage signal line CL and the pixel electrode PX which is arranged close to the counter voltage signal line CL to a value different from a distance W2 between respective pixel electrodes PX. This implies that when the number of the pixel electrodes PX is already fixed and the distance between the pixel region can be variably set, the optimum pixel constitution can be easily realized by adjusting the distance W1 between the counter voltage signal line CL and the pixel electrode PX which is arranged close to the counter voltage signal line CL.

Further, since the counter voltage signal lines CL are formed over the upper surface of the protective film PSV2 having a small dielectric constant, the field strength between the counter voltage signal line CL and the pixel electrode PX which is arranged close to the counter voltage signal line CL can be made larger than the field strength between the counter electrode CT and the pixel electrode PX. Accordingly, to make the luminance in the inside of the pixel uniform, it is preferable to set the relationship between distances W1 and W2 to W1>W2. Further, assuming a film thickness of the protective film PSV2 as d, it is preferable to set the relationship between distances W1 and W2 to W1>W2+d.

Further, to reduce noises from the drain signal line DL, it is preferable to set the relationship between distances W1 and W3 to W1>W3 as shown in FIG. 8. Here, W3 is a space-apart distance between the counter voltage signal line CL and the counter electrode CT arranged close to the counter voltage signal line CL. Due to such a constitution, the noise electric field from the drain signal line DL is confined to an equipotential surface of the counter voltage signal line CL and the counter electrode CT having the equal potential so that leaking of noise electric field to the outside can be suppressed.

Here, it is preferable to form the counter voltage signal line CL such that the counter voltage signal line CL has sides thereof arranged parallel to the running direction of the drain signal line DL projected from the drain signal line DL by an amount equal to or more than ⅓×W1.

The above-mentioned embodiment can adopt a multi-domain method by providing one or a plurality of bent portions to respective pixel electrodes PX in the longitudinal direction. In this case, along with the adoption of the multi-domain method, by adopting a pattern in which the drain signal line DL and the counter voltage signal line CL have bent portions in the same manner as the pixel electrodes PX which are shifted in the x direction, it is possible to obtain the above-mentioned advantageous effects.

Embodiment 7

Figure 9A:
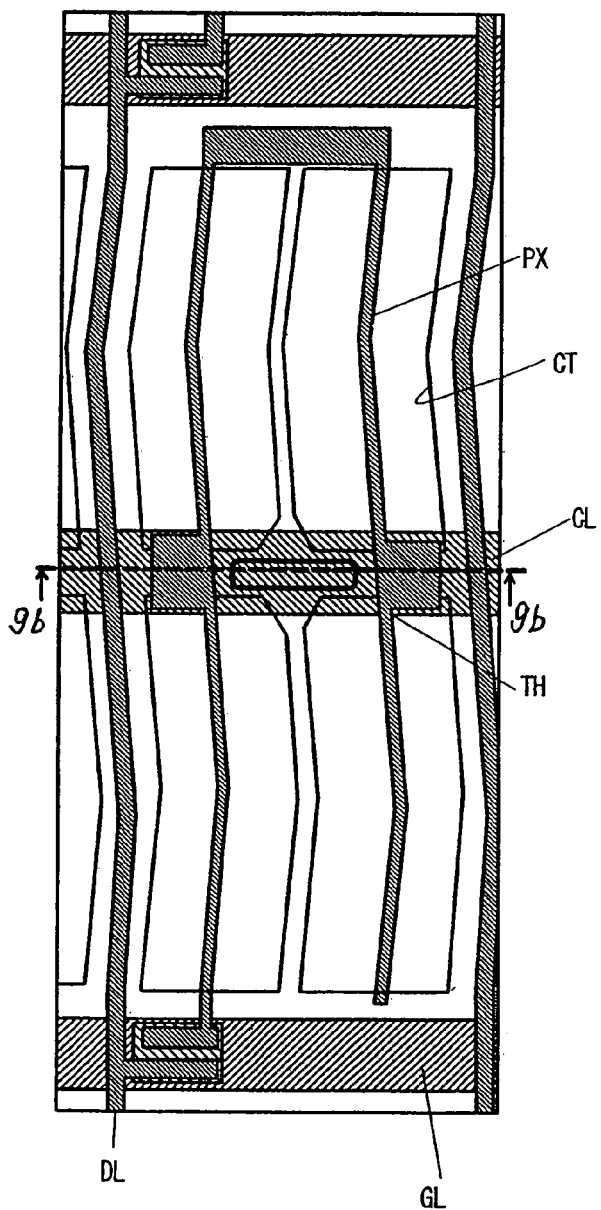
FIG. 9A is a plan view of the pixel of another liquid crystal display device according to the present invention and FIG. 9B is a sectional view taken along line 9b.
Figure 9B:
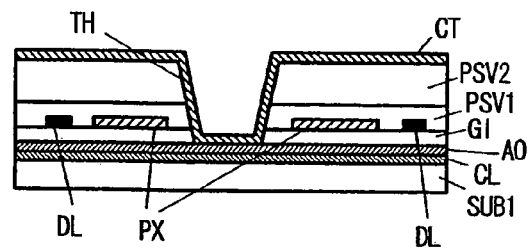

FIG. 9A is a plan view showing the pixel of another liquid crystal display device of the present invention and is a view corresponding to FIG. 7A. On the other hand, FIG. 9B is a cross-sectional view taken along a line 9b-9b in FIG. 9A.

The difference of FIG. 9A from FIG. 7A is, first of all, that the pixel electrodes PX are formed on the same layer as the drain signal lines DL over the insulation film GI.

Further, the protective film PSV1 and the protective film PSV2 are sequentially formed on the insulation film GI such that these protective film PSV1, PSV2 also cover the pixel electrodes PX and the drain signal lines DL, and the counter electrodes CT having a lattice-like pattern are formed on the upper surface of the protective film PSV2 such that the counter electrodes CT also covers the drain signal lines DL and the gate signal lines GL.

Further, the counter electrodes CT are electrically connected to the counter voltage signal lines CL which are formed as a layer below the insulation film GI via the through holes TH formed in the protective film PSV2, the protective film PSV1 and the insulation film GI in a penetrating manner.

Here adopted is a multi-domain method in which the pixel electrodes PX and the counter electrodes CT (drain signal lines DL) have a plurality of bent portions along the running direction thereof.

In this case, the counter voltage signal lines CL are simultaneously formed at the time of forming the gate signal lines GL. It is preferable that the counter voltage signal lines CL are made of Al or an AL alloy layer, for example, and an oxide film AO is formed on a surface thereof by anodizing.

In this embodiment, the through holes TH are formed in the protective film PSV2, the protective film PSV1 and the insulation film GI in such a manner that portions of the anodized counter voltage signal lines CL are exposed and the counter electrodes CT are formed such that the counter electrodes CT cover the through holes TH.

That is, the electric connection between the counter electrodes CT and the counter voltage signal lines Cl is performed by the capacitive coupling via the oxide film AO so that it is not specifically necessary to remove the oxide film AO.

Since the counter electrodes CT adopt a lattice-like pattern, it is possible to supply electricity from these counter electrodes CT and hence, the counter electrodes CT play a role of stabilizing a so-called common potential even when electricity is not directly supplied to the counter voltage signal lines CL.

Figure 10:
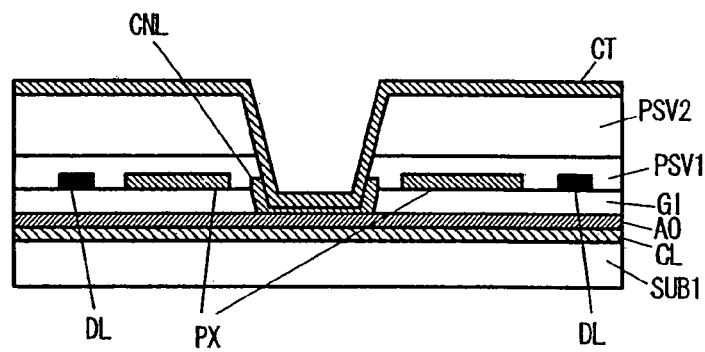
FIG. 10 is a cross-sectional view of the pixel of another liquid crystal display device according to the present invention.

In view of the above, as shown in FIG. 10, it is possible to further insert a conductive layer CNL made of the same material as the drain signal lines DL between the electrical connecting portions of the anodized counter voltage signal lines CL and the counter electrodes CT.

Further, in forming such a capacitive coupling constitution, the counter voltage signal lines CL and the counter electrodes CT may differ in material from each other. This is because that even when a stress is generated between them and a crack occurs at a joint portion, it is possible to ensure the direct electrical connection.

Embodiment 8

Figure 11A:
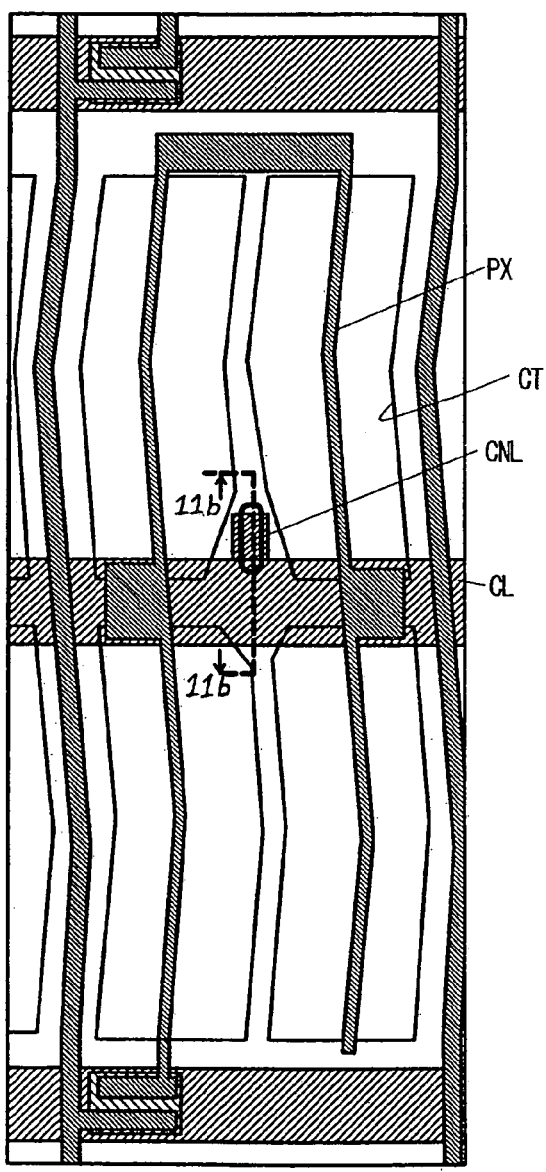
FIG. 11A is a plan view of the pixel of another liquid crystal display device according to the present invention and FIG. 11B is a sectional view taken along line 11b.
Figure 11B:
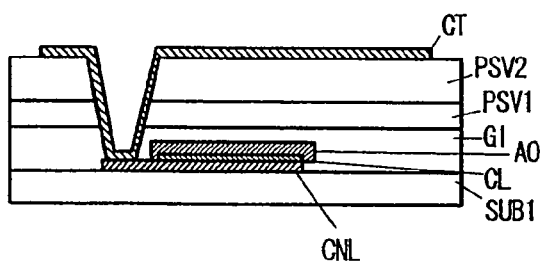

FIG. 11A is a plan view of the pixel of another liquid crystal display device of the present invention and is a view corresponding to FIG. 9A. On the other hand, FIG. 11B is a cross-sectional view taken along a line 11b-11b in FIG. 11A.

Compared with the embodiment shown in FIG. 9A, the counter voltage signal lines CL are made of Al (or Mo, Ti, Ta, W, Zr, Si or an alloy containing one or a plurality of these metals) and the oxide film AO is formed on the counter voltage signal line CL by anodizing in the same manner. On the other hand, this embodiment differs from the embodiment shown in FIG. 9A in that another conductive layer CNL made of metal other than Al or the Al alloy (for example, Cr, Mo, W, Ti, Zr or alloy containing one or more of these metals) is formed below a portion of the oxide film AO, and the conductive layer CNL is formed such that the conductive layer CNL extends to a region other than a region where the counter voltage signal line CL is formed.

The extending portion of the conductive layer CNL is configured to function as a contact portion which comes into contact with the counter electrode CT. Due to such a constitution, even when the counter voltage signal line CL is anodized, the metal layer is not anodized and hence, it is possible to form a terminal portion which can ensure the sufficient electric connection between the metal layer and the counter voltage signal line CL.

Here, the conductive layer CNL is formed over a whole area of the region where the counter voltage signal line CL is formed at portions except for the extending portions. In other words, the conductive layer CNL may be formed in the same pattern as the counter voltage signal line CL where an extension portion is formed at a portion thereof.

Figure 12:
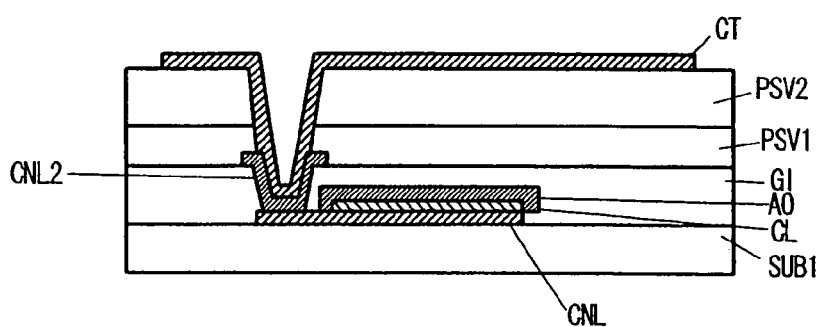
FIG. 12 is a cross-sectional view of the pixel of another liquid crystal display device according to the present invention.

FIG. 12 is a cross-sectional view showing the pixel of another liquid crystal display device according to the present invention and is a view which corresponds to FIG. 11B.

In this embodiment, the electric connection between the conductive layer CNL and the counter electrode CT is established through a conductive layer CNL2 made of the same material as the material layer of the drain signal line DL.

Due to such a constitution, the contact area between the metal layer and the counter electrode CT can be increased so that the reliability of the connection can be enhanced.

Embodiment 9

As another embodiment of the constitution described in the above-mentioned embodiment 8, the metal layer may be replaced with a light-transmitting conductive layer such as ITO, IZO or the like.

In this case, since the counter electrode CT is also made of the light-transmitting layer, it is possible to have an advantageous effect that even when the area of the contact portion between them is increased, the numerical aperture of the pixel region is not reduced.

Embodiment 10

Figure 13A:
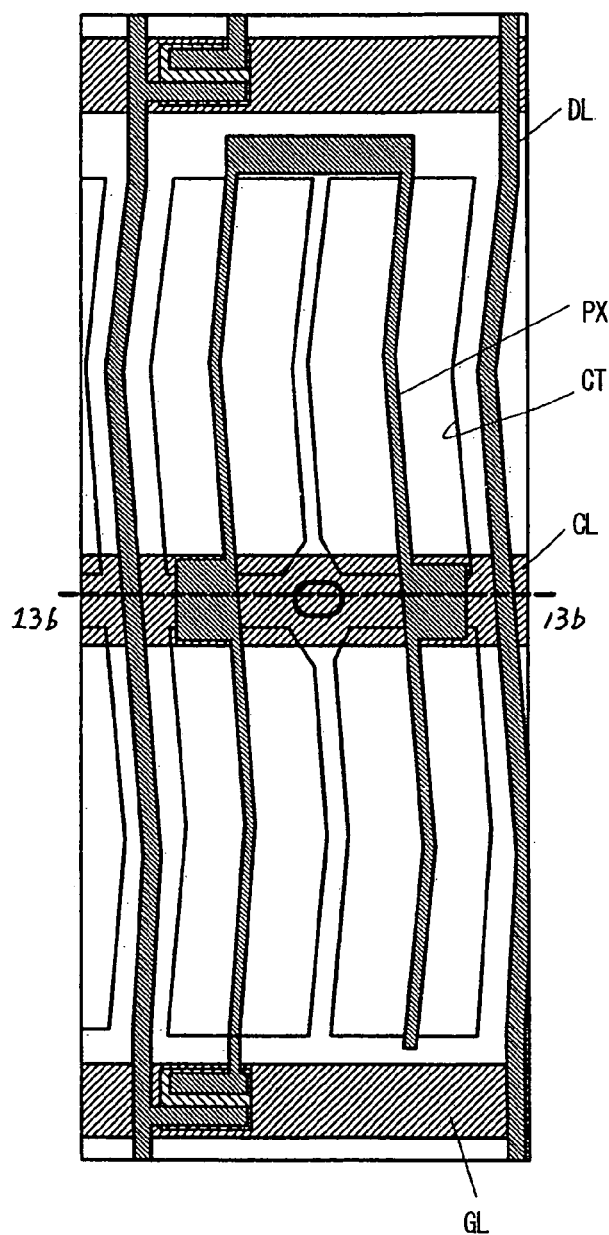
FIG. 13A is a plan view of the pixel of another liquid crystal display device according to the present invention and FIG. 13B is a sectional view taken along line 13b.
Figure 13B:
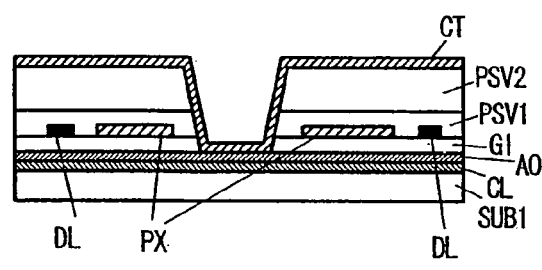

FIG. 13A is a plan view of the pixel of another liquid crystal display device of the present invention and is a view corresponding to FIG. 11A. On the other hand, FIG. 13B is a cross-sectional view taken along a line 13b-13b in FIG. 13A.

The difference of FIG. 13A from FIG. 11A lies in that at the electric connecting portion between the counter electrode CT and the counter voltage signal line CL, the oxide film AO which is formed on the surface of the counter voltage signal line CL is configured such that the oxide film AO is not partially formed at the time of anodizing.

That is, by immersing the whole transparent substrate SUB1 on which the counter voltage signal lines CL are formed into an electrolytic solution and by applying a voltage in a state that the counter voltage signal line CL forms one electrode and another separately-prepared electrode plate immersed in the electrolytic solution forms another electrode (anodizing), the anodic oxide film is formed on the surface of the counter voltage signal line CL.

In this case, at the connecting portion between the counter voltage signal line CL and the counter electrode CT, the anodizing is performed in a state that a resist film is selectively formed. By removing the resist film at a stage that the anodizing is completed, it is possible to obtain the counter voltage signal line CL which exposes the surface made of Al or the AL alloy at removed portions thereof.

The resist film is formed by a usual exposure treatment in which a photo resist is formed on the entire surface of the counter voltage signal line CL, then the exposure is performed using a mask exposure, and finally an unnecessary resist is removed.

In this case, it is preferable that the counter electrode CT is formed not only on the portion of the counter voltage signal line CL where the oxide film AO is removed but also on a region where the oxide film AO is formed.

Otherwise, Al or the Al alloy which is not anodized directly faces the insulation film GI and hence, there is a possibility that hillock occurs.

Embodiment 11

Figure 14:
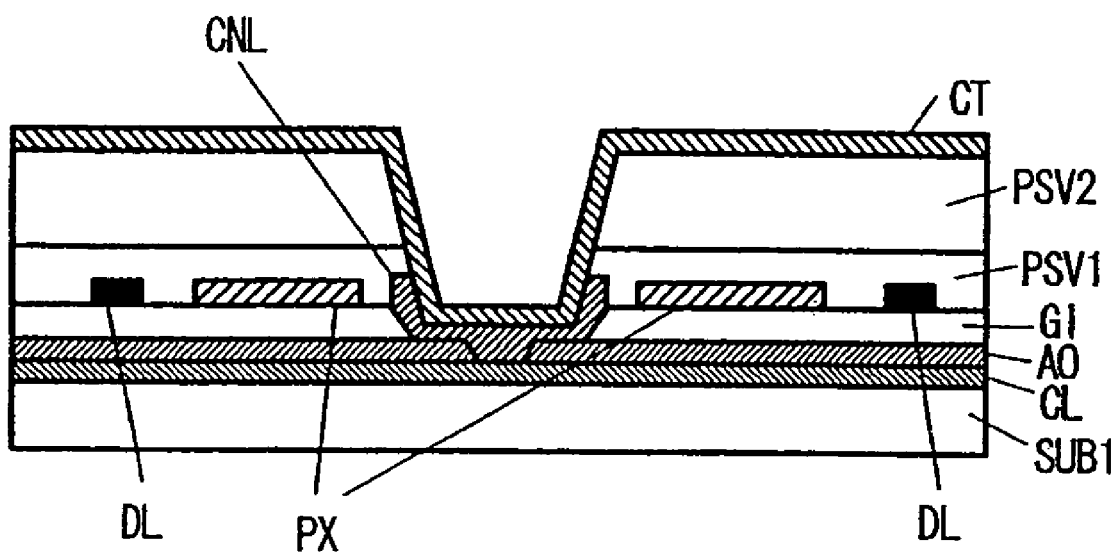
FIG. 14 is a cross-sectional view of the pixel of another liquid crystal display device according to the present invention.

FIG. 14 is a cross-sectional view the pixel of another liquid crystal display device according to the present invention and is a view which corresponds to FIG. 13B.

The difference of FIG. 14 from that of FIG. 13B lies in that in connecting the counter electrode CT and the counter voltage signal line CL, the conductive layer CNL which is made of the same material as the material of the drain signal line DL which is formed on the insulation film GI is interposed.

Due to such a constitution, the direct connection between Al or an AL alloy of the counter voltage signal line CL and the light-transmitting conductive layer made of ITO or the like can be obviated and hence, the increase of the connection resistance can be suppressed. This is because that the light-transmitting conductive layer is an oxide and hence, when the conductive layer is brought into direct contact with Al or the Al alloy, Al or the Al alloy is oxidized and the connection resistance is increased.

Embodiment 12

FIG. 15A to FIG. 15C are plan views of another liquid crystal display device according to the present invention.

The circle in the drawings show contact holes connecting between the counter voltage signal line CL and the counter electrode CT and the dotted line outline represents a dot comprised of three pixels (red, green and blue for display). In FIG. 15A, the contact hole connecting between the counter voltage signal line CL and the counter electrode CT is made for every pixel of the dot. In FIG. 15B, the connection between the counter voltage signal line CL and the counter electrode CT is made at alternate pixels of a dot. In FIG. 15C, the contact holes connecting between the counter voltage signal line CL and the counter electrode CT is made at one pixel of each dot.

As mentioned above, the counter voltage signal lines CL or the counter electrodes CT are formed in a lattice-like pattern which defines respective pixel regions and hence, the connection between the counter voltage signal lines CL and the counter electrodes CT can be set arbitrarily in terms of position as well as number.

However, by positioning the connection between the counter voltage signal lines CL and the counter electrodes CT within the pixels which exhibit relatively high luminance, the influence of such connection to the luminance can be prevented.

Further, when so-called columnar spacers are arranged between the transparent substrate SUB1 and the transparent substrate SUB2 and are formed on either one of these substrates, the pixel regions where the spacers are formed and the pixel regions where the connection between the counter voltage signal lines CL or the counter electrodes CT is established may be separately provided.

Due to such a constitution, it is possible to prevent the stereoscopic structure of the specific pixel regions from becoming relatively complicated compared to the corresponding structure of other pixels and hence, it is possible to obviate in advance the possibility that an unpredicted failure occurs only on the particular pixels due to the difference in the stereoscopic structure.

As has been described heretofore, according to the liquid crystal display device of the present invention, it is possible to enhance the numerical aperture of the pixel regions. Further, the reliable connection between the counter electrode and the counter voltage signal line can be ensured.

What is claimed is:

1. A display device comprising:
   an insulated substrate;
   a thin film transistor formed over the insulated substrate;
   a first electrode formed over the insulated substrate and connected to one terminal of the thin film transistor;
   a second electrode formed over the insulated substrate and formed of a same material as a material of the first electrode;
   a first insulating layer formed over the insulated substrate, the first electrode, and the second electrode;
   a third electrode formed over the first insulating layer and connected to another terminal of the thin film transistor;
   a fourth electrode formed over the first insulating layer, and formed of a same material as a material of the third electrode;
   a second insulating layer formed over the first insulating layer, the third electrode, and the fourth electrode;
   a fifth electrode formed over the second insulating layer; and
   a contact hole formed in the first insulating layer and the second insulating layer;
   wherein the fifth electrode is connected to the second electrode via the fourth electrode in the contact hole.

2. A display device according to claim 1, wherein when the insulated substrate is viewed in plan view, a portion of the contact hole of the first insulating layer is different from a portion of the contact hole of the second insulating layer.

3. A display device according to claim 1, wherein the first electrode and the second electrode comprise one of an Al layer and an Al alloy layer having an anodized surface, and the fifth electrode and the fourth electrode are connected by a capacitive coupling with the second electrode in the contact hole.

4. A display device according to claim 1, wherein the first electrode and the second electrode comprise one of an Al layer and an Al alloy layer having an anodized surface, and the second electrode comprises a conductive layer formed below the one of the Al layer and the Al alloy layer and exposed from the one of the Al layer and the Al alloy layer, and the fifth electrode is electrically connected to the conductive layer of the second electrode via the fourth electrode in the contact hole.

* * * * *